(12) United States Patent
Gu et al.

(10) Patent No.: US 9,921,889 B2
(45) Date of Patent: Mar. 20, 2018

(54) METHOD AND APPARATUS FOR MANAGING ELECTRONIC DEVICE

(71) Applicants: Beijing Lenovo Software Ltd., Beijing (CN); Lenovo (Beijing) Limited, Beijing (CN)

(72) Inventors: Hongliang Gu, Beijing (CN); Hao Chen, Beijing (CN); Qian Zhao, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 238 days.

(21) Appl. No.: 14/482,346

(22) Filed: Sep. 10, 2014

(65) Prior Publication Data
US 2015/0089361 A1    Mar. 26, 2015

(30) Foreign Application Priority Data

Sep. 24, 2013 (CN) .......................... 2013 1 0439855
Nov. 18, 2013 (CN) .......................... 2013 1 0581123

(51) Int. Cl.
| | | |
|---|---|---|
| G06F 3/0346 | (2013.01) | |
| G06F 9/54 | (2006.01) | |
| G06F 3/01 | (2006.01) | |
| H04N 9/31 | (2006.01) | |

(52) U.S. Cl.
CPC .............. G06F 9/542 (2013.01); G06F 3/016 (2013.01); G06F 3/0346 (2013.01); H04N 9/31 (2013.01); H04N 9/3173 (2013.01)

(58) Field of Classification Search
CPC .................................... G06F 9/54; G06F 3/01
See application file for complete search history.

(56) References Cited

U.S. PATENT DOCUMENTS

| 8,977,304 B2 * | 3/2015 | Ramanujam ............ H04W 4/14 |
| | | 455/412.1 |
| 2007/0015503 A1 * | 1/2007 | Choi ................. H04M 1/72519 |
| | | 455/425 |

(Continued)

FOREIGN PATENT DOCUMENTS

| CN | 101852978 A | 10/2010 |
| WO | WO-2006033361 A1 | 3/2006 |
| WO | WO-2014209351 A1 | 12/2014 |

OTHER PUBLICATIONS

"German Application Serial No. 10 2014 113 701.9, Office Action dated Dec. 2, 2016", w/ English Translation, (dated Dec. 2, 2016), 7 pgs.

(Continued)

*Primary Examiner* — David Choi

(74) *Attorney, Agent, or Firm* — Schwegman Lundberg & Woessner, P.A.

(57) ABSTRACT

A method and an apparatus for managing an electronic device are provided. The method comprises: determining a state of the electronic device; monitoring whether an instruction for invoking a notification component in the electronic device has been generated when the state of the electronic device satisfies a predetermined condition; and intercepting the instruction for invoking the notification component to prevent a notification event associated with the instruction from being executed.

14 Claims, 3 Drawing Sheets

(56) References Cited

U.S. PATENT DOCUMENTS

| | | | | |
|---|---|---|---|---|
| 2008/0256471 | A1* | 10/2008 | Okamoto | G06F 3/0486 |
| | | | | 715/769 |
| 2010/0198608 | A1* | 8/2010 | Kaboff | G06Q 10/00 |
| | | | | 705/2 |
| 2010/0304722 | A1 | 12/2010 | Tanaka | |
| 2011/0081891 | A1* | 4/2011 | Benninger | H04M 1/72569 |
| | | | | 455/412.2 |
| 2012/0013857 | A1 | 1/2012 | Yoshikawa et al. | |
| 2012/0110511 | A1* | 5/2012 | Howard | G06F 3/0488 |
| | | | | 715/835 |
| 2012/0196583 | A1* | 8/2012 | Kindo | H04M 1/6091 |
| | | | | 455/415 |
| 2013/0044072 | A1* | 2/2013 | Kobayashi | H04M 1/0237 |
| | | | | 345/173 |
| 2013/0100017 | A1* | 4/2013 | Papakipos | H04L 12/1845 |
| | | | | 345/158 |
| 2013/0132854 | A1* | 5/2013 | Raleigh | G06F 3/0482 |
| | | | | 715/738 |
| 2013/0288722 | A1* | 10/2013 | Ramanujam | H04W 4/14 |
| | | | | 455/466 |
| 2014/0063473 | A1* | 3/2014 | Pasolini | G02B 27/646 |
| | | | | 353/98 |
| 2014/0099997 | A1* | 4/2014 | Nakahara | H04M 19/04 |
| | | | | 455/566 |
| 2014/0368333 | A1* | 12/2014 | Touloumtzis | H04L 67/24 |
| | | | | 340/505 |
| 2015/0035721 | A1* | 2/2015 | Bell | H04M 19/048 |
| | | | | 345/1.2 |
| 2015/0089361 | A1* | 3/2015 | Gu | H04N 9/3173 |
| | | | | 715/702 |
| 2015/0141066 | A1* | 5/2015 | Ramanujam | H04W 4/14 |
| | | | | 455/466 |

OTHER PUBLICATIONS

"German Application Serial No. 10 2014 113 701.9, Office Action dated Jul. 13, 2016", w/ English Translation, (dated Jul. 13, 2016), 12 pgs.

"Chinese Application Serial No. 201310439855.X, Office Action dated Apr. 25, 2016", w/ English Translation, (dated Apr. 25, 2016), 11 pgs.

"Chinese Application Serial No. 201310439855.X, Office Action dated Dec. 13, 2016", w/ English Translation, (dated Dec. 13, 2016), 15 pgs.

* cited by examiner

METHOD AND APPARATUS FOR MANAGING ELECTRONIC DEVICE

CROSS-REFERENCE TO RELATED APPLICATION(S)

This application claims priority to the Chinese Application No. 201310581123.4 filed on Nov. 18, 2013 and the Chinese Application No. 201310439855.X filed on Sep. 24, 2013, which are incorporated herein by reference in their entirety.

TECHNICAL FIELD

The present disclosure relates to terminal technology, and more particularly, to a method and an apparatus for managing an electronic device.

BACKGROUND

With the development of electronic device techniques, projecting components have been integrated into electronic devices, such that users can give various presentations anytime and anywhere by means of the projection function implemented in the electronic devices, without having to carry heavy projectors.

When a user utilizes an electronic device having a projecting component for projection, he/she enables an application in the electronic device for the projecting component, sets the projecting component integrated in the electronic device to face towards a projection screen or wall, and places the electronic device horizontally on a table for achieving the projection function.

During the implementation of the present disclosure, the inventors found at least the following problems. The electronic device having an integrated projecting component is typically a mobile phone which serves mainly as a communication device. Hence, when the electronic device receives an incoming call and the electronic device is set to vibrate in response to an incoming call, a vibration motor in the electronic device will be activated to notify the user that an incoming call is received. If the electronic device receives an incoming call while projecting a picture, the electronic device vibrates, which makes the picture being projected on a projection screen or wall unstable and thus adversely affects the projection effect.

The inventors further noticed that, in some use scenarios, the user of the electronic device may need to support the electronic device using e.g., a table as a supporting body. If the electronic device receives information, such as an incoming call or a Short Message Service (SMS) message when it is vertically supported on the supporting body, the vibration motor within the electronic device may be activated, which makes the electronic device unstable. Hence, the user of the electronic device needs to switch the vibration motor in the electronic device on and off frequently, which is troublesome and time-consuming and thus degrades user experience.

SUMMARY

The embodiments of the present disclosure provide a method and an apparatus for managing an electronic device as follows.

In an aspect, a method for managing an electronic device is provided. The method comprises: determining a state of the electronic device; monitoring whether an instruction for invoking a notification component in the electronic device has been generated when the state of the electronic device satisfies a predetermined condition; and intercepting, in response to that the instruction for invoking the notification component has been generated, the instruction for invoking the notification component, to prevent a notification event associated with the instruction for invoking the notification component from being executed.

Preferably, the state of the electronic device satisfies the predetermined condition when a projection function of the electronic device is being executed or the electronic device is fixed to a supporting body.

Preferably, the method further comprises: invoking a second notification component different from the notification component in the electronic device.

Preferably, the second notification component is a speaker unit.

Preferably, said determining the state of the electronic device comprises: determining whether a notification message is detected, wherein the notification message is issued by an operating system for indicating that a projection function has been invoked; and determining that the state of the electronic device satisfies the predetermined condition if the notification message is detected.

Preferably, the notification component is a vibrator unit.

Preferably, said monitoring whether the instruction for invoking the notification component in the electronic device has been generated comprises: determining that the instruction for invoking the notification component in the electronic device has been generated when the electronic device receives a trigger event and the electronic device is set to vibrate in response to the trigger event.

Preferably, the trigger event comprises one of: the electronic device receiving a message, the electronic device receiving an incoming call, the electronic device receiving an event that a user touches a screen, and an application running in the electronic device triggering a vibration instruction.

Preferably, when a projection function of the electronic device is being executed, the method further comprises detecting a current orientation of the electronic device, and monitoring whether the instruction for invoking the notification component in the electronic device has been generated when the current orientation of the electronic device is the same as a predetermined orientation.

Preferably, said detecting the current orientation of the electronic device comprises: determining that the current orientation of the electronic device is the same as the predetermined orientation when a sensor in the electronic device detects that the electronic device is placed horizontally.

Preferably, said determining the state of the electronic device comprises: detecting a current orientation of the electronic device; determining whether the current orientation of the electronic device has changed within a predetermined time period; and determining that the electronic device is fixed to a supporting body when it is determined that the current orientation of the electronic device has not changed within the predetermined time period.

Preferably, the electronic device has a first application installed thereon, and when the electronic device is fixed to a supporting body, the state of the electronic device satisfies the predetermined condition if the first application is enabled.

In another aspect, an apparatus for managing an electronic device is provided. The apparatus comprises: a determining module configured to determine a state of the electronic device; a monitoring module configured to monitor whether an instruction for invoking a notification component in the electronic device has been generated when the state of the electronic device satisfies a predetermined condition; and an intercepting module configured to intercept, in response to that the instruction for invoking the notification component has been generated, the instruction for invoking the notification component, so as to prevent a notification event associated with the instruction for invoking the notification component from being executed.

Preferably, the state of the electronic device satisfies the predetermined condition when a projection function of the electronic device is being executed or the electronic device is fixed to a supporting body.

Preferably, the intercepting module comprises a second notification component invoking module, configured to invoke a second notification component different from the notification component in the electronic device.

Preferably, the determining module is further configured to determine that the state of the electronic device satisfies the predetermined condition if the notification message is detected by detecting a notification message issued by an operation system for indicating that a projection function has been invoked.

Preferably, the determining module is further configured to: determine whether a first application installed on the electronic device is enabled when the electronic device is fixed to a supporting body; and determine that the state of the electronic device satisfies the predetermined condition when it is determined that the first application is enabled.

Preferably, the monitoring module is further configured to determine that the instruction for invoking the notification component in the electronic device has been generated when the electronic device receives a trigger event and the electronic device is set to vibrate in response to the trigger event.

Preferably, the trigger event comprises one of: the electronic device receiving a message, the electronic device receiving an incoming call, the electronic device receiving an event that a user touches a screen, and an application running in the electronic device triggering a vibration instruction.

Preferably, the monitoring module further comprises: an orientation detecting module configured to detect a current orientation of the electronic device; and an orientation determining module configured to monitor whether the instruction for invoking the notification component in the electronic device has been generated when the current orientation of the electronic device is the same as a predetermined orientation.

Preferably, the orientation detecting module is further configured to determine that the current orientation of the electronic device is the same as the predetermined orientation when a sensor in the electronic device detects that the electronic device is placed horizontally.

BRIEF DESCRIPTION OF THE DRAWINGS

In order to illustrate the solutions according to the embodiments of the present application clearly, the figures used for description of the embodiments will be introduced briefly here. It is apparent to those skilled in the art that the figures described below only illustrate some embodiments of the present disclosure and other figures can be obtained from these figures without applying any inventive skills.

DETAILED DESCRIPTION

In the following, the embodiments of the present disclosure will be further detailed with reference to the figures, such that the objects, solutions and advantages of the present disclosure will become more apparent.

Example 1

Figure 1:
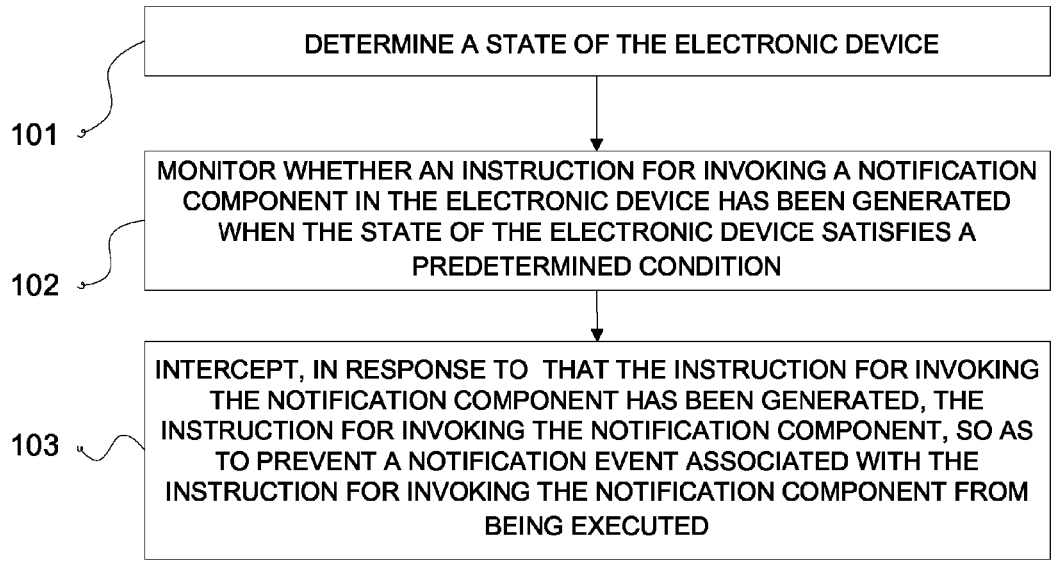
FIG. 1 is a flowchart illustrating a method for managing an electronic device according to an embodiment of the present disclosure.

According to an embodiment of the present disclosure, a method for managing an electronic device is provided. As shown in FIG. 1, the method includes the following steps.

At step 101, a state of the electronic device is determined.

At step 102, when the state of the electronic device satisfies a predetermined condition, it is monitored whether an instruction for invoking a notification component in the electronic device has been generated.

At step 103, in response to that the instruction for invoking the notification component has been generated, the instruction for invoking the notification component is intercepted, so as to prevent a notification event associated with the instruction for invoking the notification component from being executed.

The state of the electronic device satisfying the predetermined condition means that the electronic device is in a state where it is necessary to be stable. For example, the state of the electronic device is considered to satisfy the predetermined condition when a projection function of the electronic device is being executed or the electronic device is fixed to a supporting body.

With the embodiment of the present disclosure, the state of the electronic device is determined. When it is determined that the electronic device is in a state where it is desired to ensure the stability of the electronic device, e.g., when a projection function of the electronic device is being executed or the electronic device is fixed to a supporting body, it is monitored whether an instruction for invoking a notification component in the electronic device has been generated and the monitored instruction for invoking the notification component is intercepted. In this way, the electronic device will not be affected by the notification message from the notification component, which satisfies user requirements in certain scenarios and improves user experience.

Example 2

Figure 2:
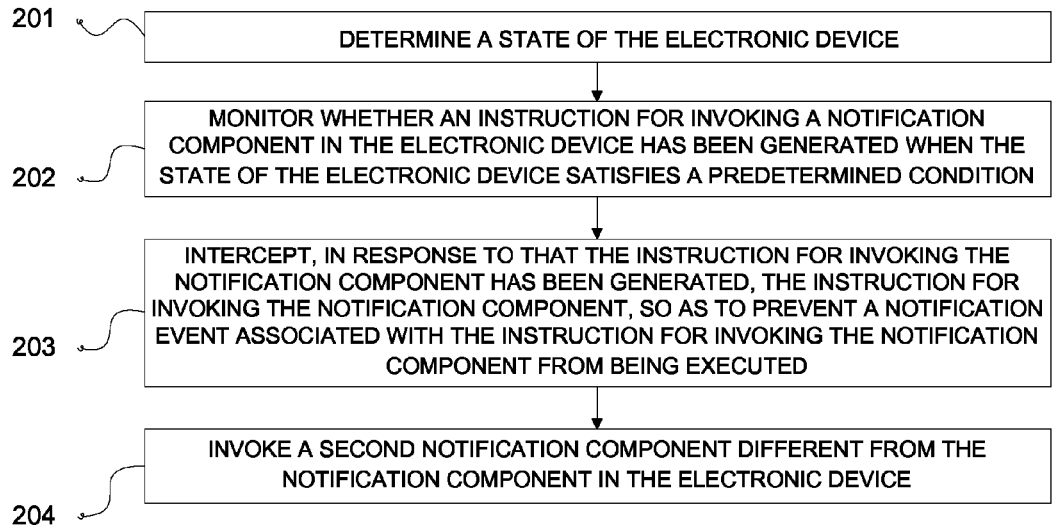
FIG. 2 is a flowchart illustrating a method for managing an electronic device according to an embodiment of the present disclosure.

According to an embodiment of the present disclosure, a method for managing an electronic device is provided. As shown in FIG. 2, the method includes the following steps.

At step 201, a state of the electronic device is determined.

At step 202, when the state of the electronic device satisfies a predetermined condition, it is monitored whether an instruction for invoking a notification component in the electronic device has been generated.

At step 203, in response to that the instruction for invoking the notification component has been generated, the instruction for invoking the notification component is intercepted, so as to prevent a notification event associated with the instruction for invoking the notification component from being executed.

At step 204, a second notification component different from the notification component in the electronic device is invoked.

According to an embodiment, the notification component is a vibrator unit. According to another embodiment, the second notification component is a speaker unit.

In an embodiment, the electronic device utilizes one side of its body or a supporting member of its own, so as to be fixed onto a supporting body, e.g., a table. This facilitates user operations such as playing a multimedia file. In another embodiment, the user is using a projection function of the electronic device.

At this time, if a vibrator unit in the electronic device is enabled to respond to a vibration instruction, when the electronic device receives an SMS message or an incoming call for example, the vibrator unit will start vibrating in response to a vibration instruction, which makes the electronic device become unstable. In the step 203, in response to the instruction for invoking the vibrator unit, the instruction is intercepted and the vibration instruction will not be responded to, which ensures the stability of the electronic device. In the step 204, the speaker unit is invoked to play a notification message for notifying the user of the electronic device of the receipt of the SMS message or incoming call.

With the embodiment of the present disclosure, the state of the electronic device is determined. When it is determined that the electronic device is in a state where it is desired to ensure the stability of the electronic device, e.g., when a projection function of the electronic device is being executed or the electronic device is fixed to a supporting body, it is monitored whether an instruction for invoking a notification component in the electronic device has been generated and the monitored instruction for invoking the notification component is intercepted. In this way, the electronic device will not be affected by the notification message from the notification component. Further, a further (second) notification component can be invoked for notifying the user, such that the user will not miss important information while the stability of the electronic device is not affected, which further improves user experience.

Example 3

Figure 3:
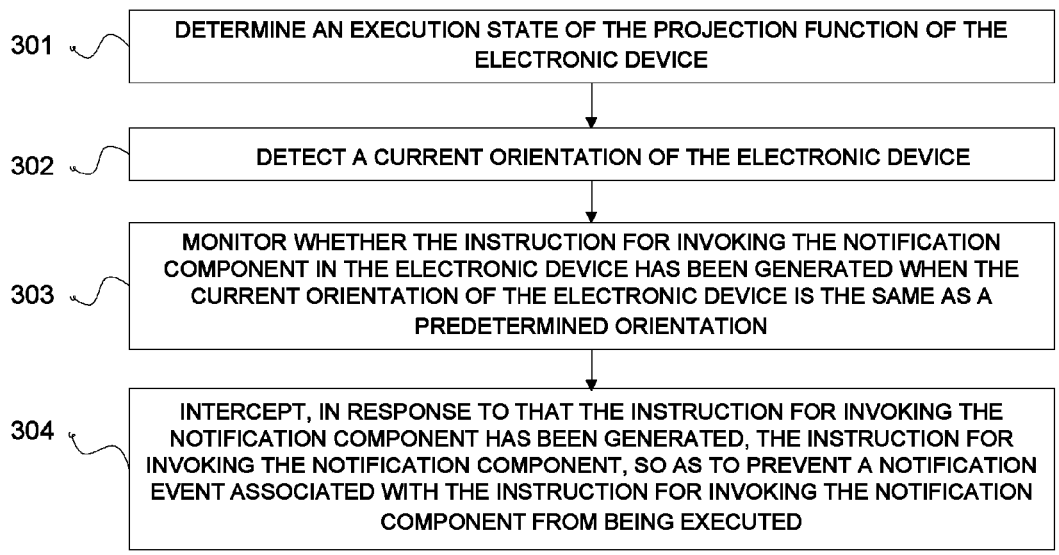
FIG. 3 is a flowchart illustrating a method for managing an electronic device according to an embodiment of the present disclosure.

According to an embodiment of the present disclosure, a method for managing an electronic device is provided. The method is applied in an electronic device having a projection function. As shown in FIG. 3, the method includes the following steps.

At step 301, an execution state of the projection function of the electronic device is determined.

Here in an embodiment of the present disclosure, when the user uses the projection function, e.g., by using a built-in projector of the electronic device, a notification message will be issued by an operating system to indicate that the projection function has been invoked. Thus, when the notification message indicating that the projection function has been invoked is detected, it can be determined that the projection function of the electronic device is being used.

That is, it is possible to determine whether the projection function of the electronic device has been invoked by detecting the notification message issued by the operating system.

Hence, the execution state of the projection function of the electronic device can be determined by determining whether a notification message, which is issued by an operating system and indicates that a projection function has been invoked, is detected. If the notification message is detected, it is determined that the projection function is being executed.

At step 302, a current orientation of the electronic device is detected.

Preferably, this step is performed after the execution state of the projection function of the electronic device has been determined. By defining the orientation of the electronic device, it is possible to determine whether to limit a notification event in the electronic device when the projection function is enabled.

Typically, when the user activates the projector in the electronic device to use the projection function, he/she will place the electronic device horizontally on a table. In this case, a sensor, e.g., a gravity sensor or an acceleration sensor, in the electronic device can detect the current orientation of the electronic device. Orientation information satisfying a defined condition can be stored in the electronic device in advance. For example, orientation information associated with a horizontal state of the electronic device can be stored in the electronic device in advance, such that it can be used for determining the orientation of the electronic device. Here, a certain range can be set, such that the condition can be satisfied when the electronic device is placed in a substantially horizontal manner, thereby ignoring a slight difference between the surface of the table and the horizontal plane.

Thus, in the step 302, it is determined whether the detected current orientation of the electronic device is the same as a predetermined orientation. In particular, it is determined that the detected current orientation of the electronic device is the same as the predetermined orientation when the sensor in the electronic device detects that the electronic device is placed horizontally.

At step 303, it is monitored whether the instruction for invoking the notification component in the electronic device has been generated when the current orientation of the electronic device is the same as the predetermined orientation.

Here the notification component can be a vibration motor or a microphone in the electronic device that is used to notify the user that a new message is received or an event occurs in response to an instruction.

Here, the step of monitoring whether the instruction for invoking the notification component in the electronic device has been generated includes: determining that the instruction for invoking the notification component in the electronic device has been generated when the electronic device receives a trigger event and the electronic device is set to vibrate in response to the trigger event.

In particular, the trigger event may include one of: the electronic device receiving a message, the electronic device receiving an incoming call, the electronic device receiving an event that a user touches a screen, and an application running in the electronic device triggering a vibration instruction.

At step 304, in response to that the instruction for invoking the notification component has been generated, the instruction for invoking the notification component is intercepted, so as to prevent a notification event associated with the instruction for invoking the notification component from being executed.

Here, since the instruction for invoking the notification component is intercepted, the notification component will not receive the instruction and thus will not notify the user as instructed.

With the embodiment of the present disclosure, after determining that the projection function in the electronic device is being executed, it is monitored whether the instruction for invoking the notification component in the electronic device has been generated and the monitored instruction for invoking the notification component is intercepted. In this way, the projection function, while being executed, will not be affected by a notification message from the notification component, such that the use efficiency of the projection function can be improved.

Example 4

Figure 4:
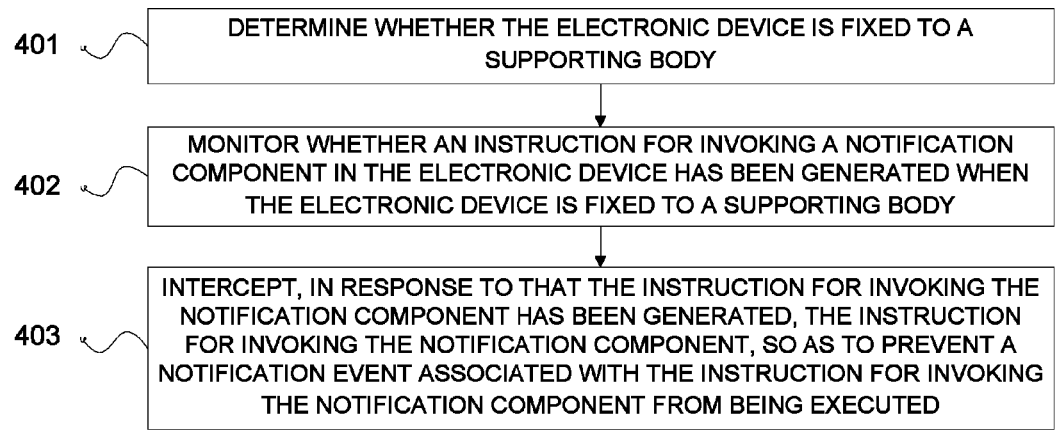
FIG. 4 is a flowchart illustrating a method for managing an electronic device according to an embodiment of the present disclosure.

According to an embodiment of the present disclosure, a method for managing an electronic device is provided. As shown in FIG. 4, the method includes the following steps.

At step 401, it is determined whether the electronic device is fixed to a supporting body.

At step 402, when the electronic device is fixed to a supporting body, it is monitored whether an instruction for invoking a notification component in the electronic device has been generated.

At step 403, in response to that the instruction for invoking the notification component has been generated, the instruction for invoking the notification component is intercepted, so as to prevent a notification event associated with the instruction for invoking the notification component from being executed.

Generally, the electronic device needs to be fixed to a supporting body only when a particular application (e.g., for playing a multimedia file) is running on the electronic device. Thus, in this example, it is assumed that the application is a first application installed on the electronic device. First, it is detected whether the first application is enabled. Subsequent operations for keeping the electronic device stable will be performed when it is detected that the first application is enabled. The first application can be determined based on attribute information of applications installed on the electronic device, which can be obtained by the electronic device from an application server. Alternatively, the first application can be determined based on an instruction received from the user that identifies first application.

In practice, the step of determining whether the electronic device is fixed to a supporting body includes: detecting a current orientation of the electronic device; determining whether the current orientation of the electronic device has changed within a predetermined time period; and determining that the electronic device is fixed to a supporting body when it is determined that the current orientation of the electronic device has not changed within the predetermined time period.

In an example, when the orientation of the electronic device maintains unchanged for the predetermined time period, e.g., two minutes, it is determined that the electronic device is fixed to a supporting body.

With the embodiment of the present disclosure, the state of the electronic device is determined. When it is determined that the electronic device is fixed to a supporting body, it is further determined whether a particular application is running on the electronic device. If a particular application is running on the electronic device, it is monitored whether the instruction for invoking the notification component in the electronic device has been generated and the monitored instruction for invoking the notification component is intercepted. In this way, the electronic device will not be affected by a notification message from the notification component when it is fixed to a supporting body and has the particular application running on it.

Example 5

Figure 5:
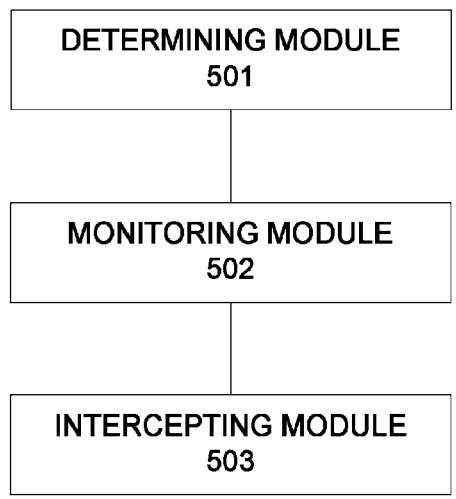
FIG. 5 is a schematic diagram showing a structure of an apparatus for managing an electronic device according to an embodiment of the present disclosure.

According to an embodiment of the present disclosure, an apparatus for managing an electronic device is provided. As shown in FIG. 5, the apparatus includes the following modules.

A determining module 501 is configured to determine a state of the electronic device.

A monitoring module 502 is configured to monitor whether an instruction for invoking a notification component in the electronic device has been generated when the state of the electronic device satisfies a predetermined condition.

An intercepting module 503 is configured to intercept, in response to that the instruction for invoking the notification component has been generated, the instruction for invoking the notification component, so as to prevent a notification event associated with the instruction for invoking the notification component from being executed.

The state of the electronic device satisfying the predetermined condition means that the electronic device is in a state where it is necessary to be stable. For example, the state of the electronic device is considered to satisfy the predetermined condition when a projection function of the electronic device is being executed or the electronic device is fixed to a supporting body.

The intercepting module may include a second notification component invoking module configured to invoke a second notification component different from the notification component in the electronic device.

According to an embodiment, the notification component is a vibrator unit. According to another embodiment, the second notification component is a speaker unit.

The determining module 501 can be configured to determine that the state of the electronic device satisfies the predetermined condition by detecting a notification message issued by an operation system for indicating that a projection function has been invoked.

The determining module 501 can be configured to: determine whether a first application installed on the electronic device is enabled when the electronic device is fixed to a supporting body; and determine that the state of the electronic device satisfies the predetermined condition when it is determined that the first application is enabled.

The monitoring module 502 can be configured to determine that the instruction for invoking the notification component in the electronic device has been generated when the electronic device receives a trigger event and the electronic device is set to vibrate in response to the trigger event.

In an embodiment, the trigger event includes one of: the electronic device receiving a message, the electronic device receiving an incoming call, the electronic device receiving an event that a user touches a screen, and an application running in the electronic device triggering a vibration instruction.

Figure 6:
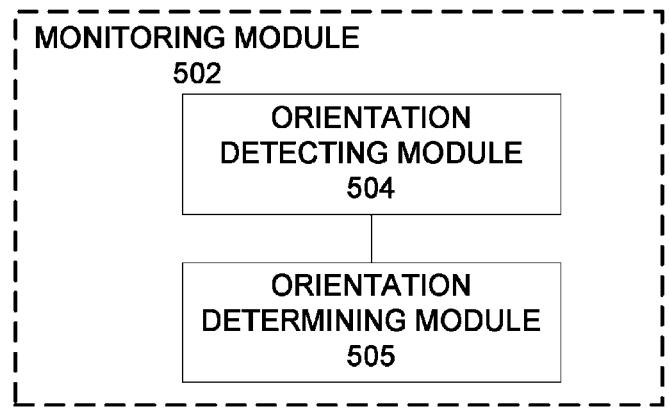
FIG. 6 is a schematic diagram showing a structure of a monitoring module according to an embodiment of the present disclosure.

As shown in FIG. 6, the monitoring module 502 may further include: an orientation detecting module 504 configured to detect a current orientation of the electronic device; and an orientation determining module 505 configured to monitor whether the instruction for invoking the notification component in the electronic device has been generated when the current orientation of the electronic device is the same as a predetermined orientation.

The orientation detecting module 504 can be configured to determine that the current orientation of the electronic device is the same as the predetermined orientation when a sensor in the electronic device detects that the electronic device is placed horizontally.

With the embodiment of the present disclosure, the state of the electronic device is determined. When it is determined that the electronic device is in a state where it is desired to ensure the stability of the electronic device, e.g., when a projection function of the electronic device is being executed or the electronic device is fixed to a supporting body, it is monitored whether an instruction for invoking a notification component in the electronic device has been generated and the monitored instruction for invoking the notification component is intercepted. In this way, the electronic device will not be affected by the notification message from the notification component, which satisfies user requirements in certain scenarios and improves user experience.

It can be appreciated by those skilled in the art that the all or part of the steps described in the above embodiments can be implemented in hardware, possibly following instructions by a program. Such program can be stored in a computer readable storage medium which can be a Read Only Memory (ROM), a magnetic disk or an optical disc.

The present disclosure is not limited to the preferred embodiments as described above. Any modifications, equivalents or improvements that can be made without departing from the spirit and principle of the present disclosure are to be encompassed by the scope of the present disclosure.

We claim:

1. A method for managing an electronic device, comprising:
    determining a state of the electronic device;
    monitoring whether an instruction for invoking a notification component in the electronic device has been generated when the state of the electronic device satisfies a predetermined condition; and
    intercepting, in response to that the instruction for invoking the notification component has been generated, the instruction for invoking the notification component, to prevent a notification event associated with the instruction for invoking the notification component from being executed,
    wherein the state of the electronic device satisfies the predetermined condition only if the electronic device is fixed to a supporting body and a first application installed on the electronic device is enabled, and wherein the first application is determined based on attribute information of applications installed on the electronic device or based on an instruction received from the user that identifies the first application.

2. The method of claim 1, further comprising:
invoking a second notification component different from the notification component in the electronic device.

3. The method of claim 1, wherein the notification component is a vibrator unit.

4. The method of claim 3, wherein monitoring whether the instruction for invoking the notification component in the electronic device has been generated comprises:
    determining that the instruction for invoking the notification component in the electronic device has been generated when the electronic device receives a trigger event and the electronic device is set to vibrate in response to the trigger event.

5. The method of claim 4, wherein the trigger event comprises one of:
    the electronic device receiving a message, the electronic device receiving an incoming call, the electronic device receiving an event that a user touches a screen, and an application running in the electronic device triggering a vibration instruction.

6. The method of claim 1, wherein when the projection function of the electronic device is being executed, the method further comprising:
    detecting a current orientation of the electronic device; and
    monitoring whether the instruction for invoking the notification component in the electronic device has been generated when the current orientation of the electronic device is the same as a predetermined orientation.

7. The method of claim 6, wherein detecting the current orientation of the electronic device comprises:
    determining that the current orientation of the electronic device is the same as the predetermined orientation when a sensor in the electronic device detects that the electronic device is placed horizontally.

8. The method of claim 1, wherein determining the state of the electronic device comprises:
    detecting a current orientation of the electronic device;
    determining whether the current orientation of the electronic device has changed within a predetermined time period; and
    determining that the electronic device is fixed to a supporting body when it is determined that the current orientation of the electronic device has not changed within the predetermined time period.

9. An apparatus for managing an electronic device, comprising:
    a processor;
    a memory, coupled to the processor and including computer program codes, the computer program codes causing the processor to:
    determine a state of the electronic device;
    monitor whether an instruction for invoking a notification component in the electronic device has been generated when the state of the electronic device satisfies a predetermined condition; and
    intercept, in response to that the instruction for invoking the notification component has been generated, the instruction for invoking the notification component, to prevent a notification event associated with the instruction for invoking the notification component from being executed,
    wherein the state of the electronic device satisfies the predetermined condition only if the electronic device is fixed to a supporting body and a first application installed on the electronic device is enabled, and wherein the first application is determined based on attribute information of applications installed on the electronic device or based on an instruction received from the user that identifies the first application.

10. The apparatus of claim 9, wherein the processor is further caused to
   invoke a second notification component different from the notification component in the electronic device.

11. The apparatus of claim 9, wherein the processor is further caused to determine that the instruction for invoking the notification component in the electronic device has been generated when the electronic device receives a trigger event and the electronic device is set to vibrate in response to the trigger event.

12. The apparatus of claim 11, wherein the trigger event comprises one of:
   the electronic device receiving a message, the electronic device receiving an incoming call, the electronic device receiving an event that a user touches a screen, and an application running in the electronic device triggering a vibration instruction.

13. The apparatus of claim 9, wherein the processor is further caused to:
   detect a current orientation of the electronic device, and
   monitor whether the instruction for invoking the notification component in the electronic device has been generated when the current orientation of the electronic device is the same as a predetermined orientation.

14. The apparatus of claim 13, wherein the processor is further caused to determine that the current orientation of the electronic device is the same as the predetermined orientation when a sensor in the electronic device detects that the electronic device is placed horizontally.

* * * * *